US006407157B2

(12) United States Patent
Oyamada et al.

(10) Patent No.: US 6,407,157 B2
(45) Date of Patent: Jun. 18, 2002

(54) GLASS FIBER REINFORCED POLYAMIDE RESIN COMPOSITION

(75) Inventors: Hiroshi Oyamada, Miyazaki; Kazuya Noda, Kanagawa, both of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/833,658

(22) Filed: Apr. 13, 2001

(30) Foreign Application Priority Data

Apr. 14, 2000 (JP) ........................................ 2000-112876
May 22, 2000 (JP) ........................................ 2000-149762

(51) Int. Cl.$^7$ ................................................ C08K 3/40
(52) U.S. Cl. ........................................ 524/494; 524/394
(58) Field of Search ................................. 524/494, 394

(56) References Cited

U.S. PATENT DOCUMENTS 4,997,612 A  *  3/1991  Gianchandai et al. ....... 264/211

\* cited by examiner

*Primary Examiner*—Edward J. Cain
(74) *Attorney, Agent, or Firm*—Birch, Stewart, Kolasch & Birch, LLP

(57) ABSTRACT

A glass fiber reinforced polyamide resin composition comprising: (A) a polyamide resin; and, per 100 parts by weight thereof, (B) from 20 to 170 parts by weight of glass fibers; (C) from 0.01 to 5 parts by weight of a higher fatty acid amide compound; and (D) from 0.005 to 5 parts by weight of a higher fatty acid metal salt having an acid value of 0.5 mg KOH/g or less. The composition preferably further comprises (E) from 0.01 to 5 parts by weight of an azine dye per 100 parts by weight of a polyamide resin (A). Also disclosed is a molded article obtained from the composition.

11 Claims, 3 Drawing Sheets

GLASS FIBER REINFORCED POLYAMIDE RESIN COMPOSITION

FIELD OF THE INVENTION

This invention relates to a glass fiber reinforced polyamide resin composition and moldings thereof, which can reduce torque at the time of melt kneading and also have excellent mechanical characteristics, vibration fatigue characteristics and external appearance of moldings.

BACKGROUND OF THE INVENTION

Polyamide resins are used in various industrial fields by utilizing their excellent properties in terms of mechanical characteristics and heat resistance. Particularly, so-called reinforced polyamide resins in which mechanical characteristics are further improved by reinforcing with glass fibers are suitable used in the periphery of automobile engine hoods, because parts therein require high reliability as mechanism elements. These parts are expected to have excellent fatigue characteristics accompanied by vibration of the engine and good appearance in view of the design and reliability for satisfying demands by customers. However, since glass fibers of the glass fiber reinforced polyamide are apt to be exposed to the surface of moldings, and such a tendency becomes more significant as the parts become large, various methods have been proposed for the purpose of improving mechanical characteristics, vibration fatigue characteristics and appearance of moldings.

For example, with the aim of improving antifreeze liquid resistance, appearance and mold release property, JP-A-11-166119 (the term "JP-A" as used herein means an "unexamined published Japanese patent application) proposes a reinforced polyamide resin composition which is produced by kneading a raw material comprised of a polyamide resin, glass fibers, an azine dye and an aliphatic bisamide compound and/or a higher fatty acid metal salt with glass fibers when the polymer is melted. However, this proposal does not describe acid value of the higher fatty acid metal salt, and there is a possibility of spoiling mechanical characteristics when the higher fatty acid metal salt having the acid value used in the Examples is added.

Also, with the aim of improving mechanical characteristics and vibration fatigue characteristics, JP-A-10-28863, JP-A-10-28865 and JP-A-11-226949 propose to increase the amount of graft polyamide existing in the interface between a polyamide and glass fibers. However, though mechanical characteristics and vibration fatigue characteristics are improved by such a complex, it has rather an opposite effect regarding the appearance of moldings due to a tendency to reduce fluidity at the time of molding as the amount of graft polyamide increases.

Also, with the aim of improving appearance of moldings, JP-A-3-100062 and JP-A-5-247341 propose a combination of glass fibers and an inorganic filler having a relatively small aspect ratio. However, though the appearance is improved by this method, vibration fatigue characteristics and mechanical characteristics are reduced.

In addition, an attempt has been made in JP-A-2-265965 to simultaneously improve mechanical characteristics and appearance of moldings by selecting polyamide 6 having relatively low melting point among polyamides and a copolymer of an aliphatic polyamide. However, it is difficult to improve vibration fatigue characteristics of the glass fiber reinforced composition by simply using these polyamides.

Also, JP-A-63-156856 and JP-A-56-30460 propose that the appearance is improved by controlling the aspect ratio and length of glass fibers existing in polyamide 46 and a polyester, but improvement of vibration fatigue characteristics cannot be expected from the glass fibers of such a shape.

On the other hand, it is general that a polyamide and a reinforcing material such as glass fibers are melt-kneaded using an apparatus such as an extruder, as a method for the production of a reinforced polyamide composition, but mixing of inorganic matter such as a reinforcing material becomes a cause of worsening productivity due to increased torque of the extruder.

Thus, regarding glass fiber reinforced polyamide resins, there is no method which can simultaneously improve mechanical characteristics, vibration fatigue characteristics and appearance of moldings, and it is inevitable to avoid increase in torque of an apparatus such as an extruder when a reinforced polyamide resin composition is melt-kneaded, so that concern has been directed toward a method which can satisfy these characteristics simultaneously and also can reduce torque at the time of melt kneading.

SUMMARY OF THE INVENTION

An object of the present invention is to provide a glass fiber reinforced polyamide resin composition and moldings thereof, which can reduce torque at the time of melt kneading and also have excellent mechanical characteristics, vibration fatigue characteristics and appearance of the moldings.

Other objects and effects of the present invention will become apparent from the following description.

With the aim of solving the above-described problems, the present inventors have conducted extensive studies and found as a result of the efforts that, when a composition prepared by combining a composition comprising a polyamide resin and glass fiber with a higher fatty acid amide compound, a higher fatty acid metal salt having a specified acid value and an azine dye at a specified ratio is used, torque at the time of melt kneading can be reduced and compositions and moldings having excellent mechanical characteristics and vibration fatigue characteristics and also excellent appearance of the moldings can be obtained. The invention has been accomplished based on this finding.

Accordingly, the invention relates to glass fiber reinforced polyamide resin compositions and moldings shown in the following items 1) to 12).

1) A glass fiber reinforced polyamide resin composition comprising:
    (A) a polyamide resin; and, per 100 parts by weight thereof,
    (B) from 20 to 170 parts by weight of glass fibers;
    (C) from 0.01 to 5 parts by weight of a higher fatty acid amide compound; and
    (D) from 0.005 to 5 parts by weight of a higher fatty acid metal salt having an acid value of 0.5 mg KOH/g or less.

2) The glass fiber reinforced polyamide resin composition according to claim 1, further comprising (E) from 0.01 to 5 parts by weight of an azine dye per 100 parts by weight of a polyamide resin (A).

3) The glass fiber reinforced polyamide resin composition according to claim 1 or 2, having a graft polyamide resin layer in an interface region between the polyamide resin (A) and glass fiber (B),
    wherein the graft polyamide resin layer has a modulus of elasticity of dynamic viscoelasticity function as calculated from an amplitude of response stress signal and a phase difference between a stimulation distortion signal and a response stress signal, each measured by a scanning viscoelasticity microscopic method, of at least larger than 1 when regarding the modulus of elasticity of the polyamide resin as 1, and wherein the graft polyamide resin layer has a thickness of from 1.0 μm to 20 μm.

4) The glass fiber reinforced polyamide resin composition according to claim 3, wherein said graft polyamide resin in the interface between the polyamide resin (A) and glass fibers (B) is present in an amount from 0.1 to 2 parts by weight per 100 parts by weight of the glass fibers (B).

5) The glass fiber reinforced polyamide resin composition according to claim 4, wherein said graft polyamide resin covers from 50 to 100% of the total surface area of the glass fibers (B).

6) The glass fiber reinforced polyamide resin composition according to claim 1 or 2, wherein the glass fibers (B) are surface-treated with a binder mainly comprising: a copolymer of maleic anhydride with an unsaturated monomer; and an aminosilane coupling agent.

7) The glass fiber reinforced polyamide resin composition according to claim 6, wherein the glass fibers (B) contain from 0.1 to 2 parts by weight of the binder per 100 parts by weight of the glass fiber.

8) The glass fiber reinforced polyamide resin composition according to claim 1 or 2, wherein the glass fibers (B) existing in the polyamide resin (A) has an aspect ratio (weight average fiber length/number average fiber diameter) of from 10 to 50, and the number average fiber diameter is within the range of from 8 to 15 μm.

9) The glass fiber reinforced polyamide resin composition according to claim 1 or 2, wherein the polyamide resin (A) is at least one compound selected from polyamide 66, polyamide 6, polyamide 610, polyamide 612, copolymers and blends thereof, and copolymers and blends of polyhexamethylene isophthalamide (polyamide 6I) with polyamide 66 and optionally polyamide 6.

10) The glass fiber reinforced polyamide resin composition according to claim 1 or 2, wherein the polyamide resin (A) has a relative viscosity of from 1.6 to 3.7 as measured at 25° C. and at a concentration of 1% in 98% sulfuric acid in accordance with JIS K6810.

11) A molded article which comprises a reinforced polyamide resin composition comprising:

(A) a polyamide resin; and, per 100 parts by weight thereof, (B) from 20 to 170 parts by weight of glass fibers;

(C) from 0.01 to 5 parts by weight of a higher fatty acid amide compound; and (D) from 0.005 to 5 parts by weight of a higher fatty acid metal salt having an acid value of 0.5 mg KOH/g or less.

12) The molded article according to claim 11, wherein the reinforced polyamide resin composition further comprises from 0.01 to 5 parts by weight of an azine dye (E), per 100 parts by weight of the polyamide resin (A).

Figure 1:
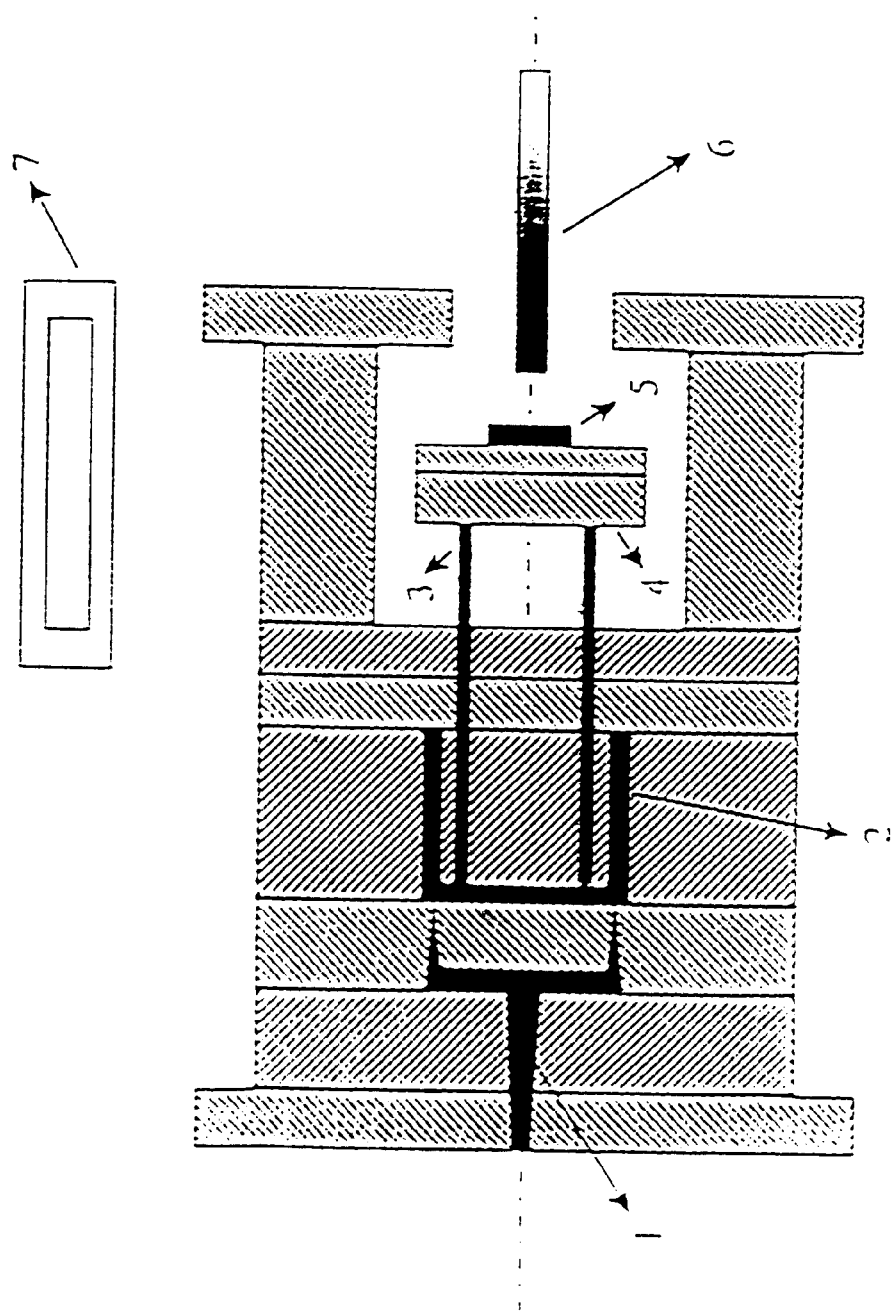
FIG. 1 is a schematic illustration showing the mold for measuring mold releasing ability used in the Examples of the invention.

In these figures, the numerals denote the following members, respectively.

1 Sprue runner
2 Cup-shaped molded article
3 Ejector pin
4 Ejector plate
5 Pressure sensor
6 Ejector rod
7 Mold release ability recorder
8 Rib part
9 Sprue
10 Dry spot measuring face
11 Model case 1 of interface layer
12 Model case 2 of interface layer

DETAILED DESCRIPTION OF THE INVENTION

The following describes the invention in detail. As the polyamide resin (A) of the invention, a general polyamide can be used. For example, at least one compound selected from: polyamide 66, polyamide 610, polyamide 612, polyamide 6T (polyhexamethylene terephthalamide) and polyamide 6I (polyhexamethylene isophthalamide) obtained by condensation polymerization of a diamine with a dicarboxylic acid; polyamide 6 and polyamide 12 obtained by ring-opening polymerization of a lactam; polyamide 11 obtained by self-condensation polymerization of an ω-aminocarboxylic acid; and copolymers and blends thereof can be cited. Among these polyamides, a homopolymer selected from polyamide 66, polyamide 6, polyamide 610 and polyamide 612, a copolymer or blend thereof and a or blend of hexamethylene isophthalamide polyamide 6I) with polyamide 66 and optionally polyamide 6 is desirable from the viewpoints of mechanical characteristics, heat resistance, crystallizing temperature, moldability and appearance of moldings.

As the polyamide resin to be used in the invention, a polyamide having a relative viscosity of from 1.6 to 3.7 when measured at 25° C. and at a concentration of 1% in 98% sulfuric acid in accordance with JIS K6810 is preferably used, and more preferred relative viscosity is within the range of from 2.0 to 3.1. The relative viscosity if less than 1.6 would cause insufficient toughness and reduction of mechanical strength depending on the moldings. Also, the relative viscosity if larger than 3.7 would cause a difficulty in carrying out molding processing and would worsen the appearance.

In this connection, it is desirable to use a polyamide whose heat stability is improved by adding to the polyamide a copper compound containing copper acetate and copper iodide (joint use of potassium iodide in some cases) as the components. Such a heat stabilization treatment may be carried out in any step of the polyamide production. For example, the polymerization may be carried out after adding a copper compound containing copper acetate and copper iodide as the constituting components to a monomer, or it may be added to a polyamide of melted state during processing step such as with an extruder or molding machine, after obtaining the polymer by polymerization. Alternatively, the compound may be directly mixed with polymer pellets and then subjected to the molding processing step.

In addition, amino-terminal groups of the polyamide resin of the invention are preferably from 20 to 200 milliequivalents, more preferably from 30 to 60 milliequivalents, based on 1 kg of the polyamide resin. When the amino-terminal groups are less than 20 milliequivalents, formation of a graft polyamide in the interface with glass fibers becomes difficult and a possibility of reducing mechanical characteristics becomes high, and a polyamide of larger than 200 milliequivalents is difficult to produce and becomes a low molecular weigh product if obtained so that the mechanical characteristics becomes insufficient.

The glass fibers (B) to be used in the invention may be any type, with the proviso that it is used as a reinforcing material of polyamide resins, but chopped type short fibers having a glass fiber length of from 1 to 10 mm and an average glass fiber diameter of from 8 to 25 $\mu$m are desirable from the viewpoint of handling ability when glass fibers are melt-kneaded with the polyamide resin. Particularly preferred shape of glass fibers is glass fibers having a fiber length of from 2 to 7 mm and an average fiber diameter of from 8 to 15 $\mu$m from the viewpoints of reinforcing effect and glass fiber dispersing ability. Glass fibers having an average diameter of less than 8 $\mu$m are difficult to effect their binding and have a possibility of causing bad influence upon mechanical characteristics due to reduction of the fiber length at a processing step such as melt kneading, and the diameter exceeding 25 $\mu$m can improve the appearance but has a possibility of reducing the mechanical characteristics at the same glass fiber concentration.

Also, the aspect ratio of the glass fibers to be contained in the polyamide resin is preferably from 10 to 50, more preferably from 20 to 40. Aspect ratio of the glass fibers to be contained if less than 10 would bear no sufficient improving ratio of mechanical characteristics and if exceeding 50 would cause frequent turn up of glass fibers on the surface of moldings to worsen appearance of the moldings. In this connection, the term "aspect ratio of glass fibers" as used herein means a value obtained by dividing weight average fiber length by number average fiber diameter. Also, diameter of the glass fiber to be contained in the polyamide is almost equal to the diameter of the glass fiber material under a state before mixing with the polyamide.

In addition, it is desirable that the glass fibers are surface-treated with a binder for polyamide resin use (this includes a binder component for the purpose of effecting so-called sizing and a surface-treating component for the purpose of effecting adhesion with polyamide resin). The binder to be used is composed of a copolymer of maleic anhydride with an unsaturated monomer and a silane coupling agent and/or an acrylic acid copolymer and/or a urethane polymer as the main constituting components, and a binder composed of a copolymer of maleic anhydride with an unsaturated monomer and an amino group-containing silane coupling agent as the main constituting components is most desirable, particularly in view of the improving effect on vibration fatigue characteristics.

Illustrative examples of the maleic anhydride-unsaturated monomer copolymer which constitutes the binder include copolymers of maleic anhydride with unsaturated monomers such as styrene, α-methylstyrene, butadiene, isoprene, chloroprene, 2,3-dichlorobutadiene, 1,3-pentadiene and cyclooctadiene, of which a copolymer of maleic anhydride with butadiene or styrene is particularly desirable. In addition, two or more of these monomers may be jointly used, or they may be used as a blend, for example, by mixing a copolymer of maleic anhydride with butadiene and a copolymer of maleic anhydride with styrene. It is desirable that the copolymer of maleic anhydride with an unsaturated monomer has an average molecular weight of 2,000 or more. Also, the ratio of maleic anhydride and the unsaturated monomer is not particularly limited. Also, in addition to the maleic anhydride copolymer, an acrylic acid copolymer or a urethane polymer may be jointly used without problem.

Regarding the silane coupling agent as another component which constitutes the binder of the invention, any silane coupling agent generally used for the surface treatment of glass fibers can be used. Its illustrative examples include aminosilane coupling agents such as γ-aminopropyltrimethoxysilane, γ-aminopropyltriethoxysilane, N-β(aminoethyl)γ-aminopropylmethyldimethoxysilane, N-β(aminoethyl)γ-aminopropyltrimethoxysilane and N-β(aminoethyl)γ-aminopropyltriethoxysilane; epoxysilane coupling agents such as γ-glycidoxypropylmethyldiethoxysilane, γ-glycidoxypropyltrimethoxysilane and γ-glycidoxypropyltriethoxysilane; methacryloxysilane coupling agents such as γ-methacryloxypropylmethyldimethoxysilane, γ-methacryloxypropyltrimethoxysilane, γ-methacryloxypropyldiethoxysilane and γ-methacryloxypropyltriethoxysilane; and vinylsilane coupling agents such as vinyltrimethoxysilane, vinyltriethoxysilane and vinyltris(β-methoxyethoxy)silane.

Two or more of these coupling agent can be used jointly. Among these agents, aminosilane coupling agents are most desirable in view of the affinity for the polyamide resin, of which γ-aminopropyltriethoxysilane and N-β(aminoethyl)γ-aminopropyltriethoxysilane are particularly desirable. Regarding using ratio of the malic anhydride copolymer and silane coupling agent, a ratio of from 1 to 100 parts by weight, preferably from 10 to 70 parts by weight, of the latter per 100 parts by weight of the former is desirable which provides relatively good balance of physical properties. In general, the malic anhydride copolymer and silane coupling agent are mixed in an aqueous solvent and used as the binder, and additives such as a surface active agent, a lubricant, a softening agent and an anti-static agent may be further added as occasion demands.

The binder is used by adhering it to the surface of glass fibers at a step for processing glass into fibers or at a step after the processing, and when this is dried, a film composed of the copolymer and coupling agent is formed on the surface of glass fibers. It is desirable that the finally adhered amount of the binder after drying is within the range of from 0.1 to 2 parts by weight per 100 parts by weight of the glass fibers. When the adhered amount is less than 0.1 part by weight, binding ability of the glass fibers becomes insufficient which may cause a problem of considerably reducing physical properties of the glass fiber reinforced polyamide resin composition due to formation of so-called hair balls in which glass fibers are entangled with one another when formulated in the polyamide resin. On the contrary, when the adhered amount is larger than 2 parts by weight, glass fibers are mutually bonded so strongly that fiber bundles are observed in the resulting moldings and their appearances therefore are apt to become poor. Most desirable adhered amount of the binder is within the range of from 0.2 to 1.0 part by weight per 100 parts by weight of the glass fibers. In this case, the adhered amount of binder is measured as the ignition loss of glass fibers after 60 minutes of burning and calculated in accordance with JIS R3420.

Mixing amount of glass fibers in the glass fiber reinforced polyamide resin composition of the invention is from 20 to 170 parts by weight, preferably from 20 to 150 parts by weight, of the glass fibers (B) per 100 parts by weight of the polyamide resin (A). The mixing amount of glass fibers if smaller than 20 parts by weight would bear no sufficient mechanical characteristics of moldings obtained by molding the glass fiber reinforced resin composition and if larger than 170 parts by weight would reduce molding fluidity of the glass fiber reinforced resin composition considerably and would not bear uniform mixing and dispersion of the glass fibers, thus entailing markedly inferior appearance of the resulting moldings.

When the glass fibers surface-treated with a binder are melt-kneaded with the polyamide resin, a graft polyamide is formed in the interface between the polyamide resin (A) and the glass fibers (B) This graft polyamide is considered to be a product of the reactions of the acid anhydride contained in the binder with the amino-terminal group of the polyamide and of the silane coupling agent functional group with the carboxyl-terminal group of the polyamide, and it is presumed that the surface fracture which occurs when shearing stress is applied to the interface between the polyamide resin and glass fibers is inhibited by the existence of the graft polyamide, so that this can be cited as an important factor for the mechanical characteristics and vibration fatigue characteristics.

The graft polyamide existing in the interface between the polyamide resin and glass fibers in the polyamide resin composition of the invention is an organic matter layer containing a polyamide as the main component which remains on the glass fiber surface without eluting in a solvent when the glass fibers are precipitated by soaking the composition in a solvent for polyamide and eluting the polyamide, and the presence of the polyamide can be confirmed by infrared absorption spectrum and pyrolytic gas chromatography analyses.

Illustratively, in the case of a glass fiber reinforced polyamide 66 resin composition for example, the glass fiber reinforced polyamide 66 resin composition is dissolved in phenol in order to separate glass fibers and un-grafted polyamide 66. The polyamide 66-phenol solution part is removed, and the remained glass fiber part is washed with phenol several times until elution of polyamide 66 stops and then washed several times with ethanol in order to remove phenol, subsequently removing ethanol by drying.

The thus obtained product is called graft glass fibers herein, and its main component can be confirmed as polyamide 66, which is to be called graft polyamide, from a result of the analysis of the graft glass fibers by a infrared absorption spectrum and a pyrolytic gas chromatography/mass spectrum (to be referred to as "Py GC/MS" hereinafter).

Amount of the graft polyamide existing on the surface of glass fibers in the composition of the invention can be obtained by measuring the glass fibers obtained by the above illustrative example in accordance with JIS R3420 (ignition loss, Ig. Loss) and calculating it from the amount of the weight loss.

Also, ratio of the graft polyamide covering total area of the glass fibers can be calculated by measuring existing ratio of surface elements of the graft glass fibers by XPS (X-ray photoelectron spectroscopy: alias ESCA).

Amount of the graft polyamide is within the range of preferably from 0.1 to 2 parts by weight, more preferably from 0.15 to 1 parts by weight, per 100 parts by weight of the glass fibers contained in the polyamide. Amount of the graft polyamide if smaller than 0.1 part by weight would bear no improving effect of mechanical characteristics and if larger than 2 parts by weight would cause reduction of molding processability due to increased viscosity of the composition. Also, ratio of the graft polyamide covering total area of the glass fibers in the composition (to be referred to as covering ratio hereinafter) is within the range of preferably from 50 to 100%, more preferably from 70 to 100%. The covering ratio if less than 50% would bear no sufficient mechanical properties and fatigue characteristics.

Figure 3:
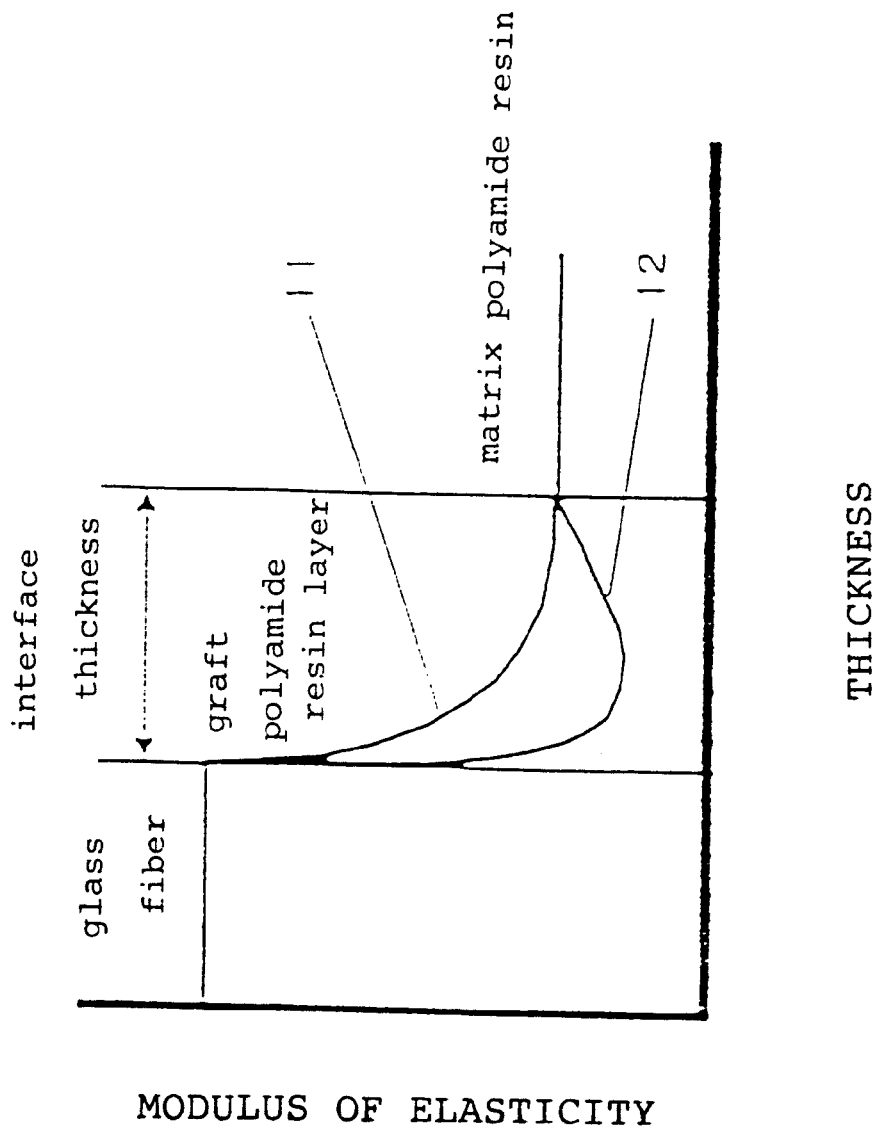
FIG. 3 is an illustrative graph showing a modulus of elasticity of a graft polyamide resin layer existing in the interface between glass fibers and polyamide resin, along its thickness direction. In this figure, the curved line 11 represents the case where the modulus of elasticity of a graft polyamide resin layer is higher than that of a polyamide resin over the whole thickness. On the other hand, the curved line 12 represents the case having a region where the modulus of elasticity of a graft polyamide resin layer is lower than that of a polyamide resin.

The term "graft polyamide resin layer formed in the interface region between the glass fibers and polyamide resin of the polyamide resin composition" as used herein means an organic matter layer containing polyamide resin as the main component, existing in the interface region between the glass fibers and polyamide resin which are present in the cutting surface finished into a mirror finished surface by freezing and cutting the polyamide resin composition or a molded article thereof, and also means a polyamide resin layer in a region where the modulus of elasticity of dynamic viscoelasticity function calculated from the "amplitude of response stress signal" and "phase difference between stimulation distortion signal and response stress signal", measured by a scanning viscoelasticity microscopic method, continuously changes until modulus of elasticity of the glass fibers reaches modulus of elasticity of the matrix polyamide resin as shown in FIG. 3.

The modulus of elasticity of the graft polyamide resin layer of the polyamide resin composition of the invention can be obtained from the dynamic viscoelasticity function calculated from the "amplitude of response stress signal" and "phase difference between stimulation distortion signal and response stress signal" measured by a scanning viscoelasticity microscopic method. The scanning viscoelasticity microscope is an apparatus in which a sine vibration is applied to a piezo-element or probe on a sample platform under such a condition that the force between the probe and the sample surface is in a repulsive region, namely under such a condition that the tip of the probe gives deformation on the sample surface, and response vibration of the same cycle from a cantilever corresponding to the vibration is detected (e.g., see "High Polymers" vol. 46, April (1997), pp. 249–251, ed. by C. Kajiyama and A. Takahara "Observation of the Molecular Movement of High Polymer Chains by Atomic Force Microscope"), that is, a measuring apparatus which can evaluate dynamic viscoelasticity function of the sample surface from the amplitude and phase difference of this change and response stress signal.

Thickness of the graft polyamide resin layer of the invention can be obtained from two-dimensional distribution of the modulus of elasticity of the dynamic viscoelasticity function calculated from the "amplitude of response stress signal" and "phase difference between stimulation distortion signal and response stress signal" measured by the scanning viscoelasticity microscopic method. In more illustratively describing, thickness of the graft polyamide resin layer is defined as the average thickness of a region which is measured in the radial direction from the circular section tip of glass fibers existing in the cutting surface finished into a mirror finished surface by freezing and cutting the polyamide resin composition or a molded article thereof, and which also continuously changes until modulus of elasticity of the glass fibers reaches modulus of elasticity of the matrix polyamide resin as shown in FIG. 3.

It is necessary that the graft polyamide resin layer of the invention has such a constitution that its modulus of elasticity is larger than the elasticity of the matrix polyamide resin and thickness of the graft polyamide resin layer is within the range of from 1.0 µm to 20 µm, preferably from 1.5 µm to 20 µm. Thickness of the graft polyamide resin layer if smaller than 1.0 µm would bear no sufficient mechanical strength, fatigue resistance and creep resistance of the resulting composition and moldings due to high concentration of stress in the interface region between the glass fibers and polyamide resin. Also, the thickness if larger than 20 µm would entail increase in pressure at the time of injection molding due to reduction of melt fluidity of the composition when molded, and also would worsen dispersion of the glass fibers due to poor opening of the glass fibers.

Examples of the higher fatty acid amide compound (C) to be used in the invention include methylenebisstearylamide, methylenebislaurylamide, ethylenebisstearylamide, ethylenebislaurylamide, ethylenebisbehenylamide, dioctadecyladipic acid amide, dioctadecylsuccinic acid amide, dihexyladipic acid amide, dihexylsuccinic acid amide, distearyladipic acid amide and distearylsuccinic acid amide. Among these compounds, ethylenebisstearylamide is desirable because of its high moldability improving effect.

Blending amount of the higher fatty acid amide compound (C) of the invention is preferably from 0.01 to 5 parts by weight, more preferably from 0.1 to 3 parts by weight, per 100 parts by weight of the polyamide resin.

Blending amount of the higher fatty acid amide compound (C) to be used in the invention if smaller than 0.01 part by weight would bear no sufficient appearance of moldings due to worsening of the mold release ability and if larger than 5 parts by weight would entail problems such as bleed out during the molding processing.

The higher fatty acid metal salt (D) to be used in the invention has an acid value of 0.5 mg-KOH/g or less, more preferably 0.1 or less. The acid value if larger than 0.5 mg-KOH/g would spoil mechanical characteristics due to sharp reduction of the molecular weight. The term "acid value" as used herein means the mg number of potassium hydroxide required for neutralizing acids such as free fatty acids and resin acids contained in 1 g of a sample.

Examples of the higher fatty acid metal salt (D) to be used in the invention include sodium salts, lithium salts, calcium salts, magnesium salts, zinc salts and aluminum salts of fatty acids having 9 or more carbon atoms such as capric acid, lauric acid, myristic acid, palmitic acid, stearic acid, behenic acid, cerotic acid, montanic acid, melissic acid, oleic acid and erucic acid, and calcium stearate, aluminum stearate, calcium montanate and sodium montanate are suitably used as those having high action and effect. Also, two or more of these higher fatty acid metal salts may be jointly used.

Amount of the higher fatty acid metal salt (D) to be used in the invention is preferably from 0.005 to 5 parts by weight, more preferably from 0.1 to 3 parts by weight, per 100 parts by weight of the polyamide resin.

Mixing amount of the higher fatty acid metal salt (D) to be used in the invention if smaller than 0.005 part by weight would bear no proper appearance of moldings or effect no reduction of torque at the time of melt kneading. Also, the amount if larger than 5 parts by weight would entail problems such as bleed out during molding processing.

These higher fatty acid amide compound and higher fatty acid metal salt can reduce torque at the time of melt kneading when they are added while melt-kneading the polyamide resin and glass fibers using an apparatus such as an extruder. In that case, a spreading agent such as polyethylene glycol or polypropylene glycol can be added in a small amount within a range which does not spoil the object of the invention, in such a manner that the higher fatty acid amide compound and higher fatty acid metal salt are not released from the surface of the glass fiber reinforced polyamide resin composition.

According to the invention, an azine dye (E) can be added.

The azine dye (E) of the invention is a mixture of azine compounds such as triphenazineoxazine and phenazineazine obtained, for example, by using aniline, nitrobenzene and hydrochloric acid as the main materials and a compound such as ferric oxide as the catalyst, which is commonly known as a black coloring agent for materials such as plastics and hides and skins but shows a specific behavior that the glossiness of moldings obtained by molding the composition is markedly improved only when it is mixed with the glass fiber reinforced polyamide. Examples of the useful azine dye include those which are commercially available under trade names of Nigrosine Base EXBP, Nubian Complex Black G-02, Nubian Black PA-0800, Nubian Black PA-0801, Nubian Black PA-0850, Nubian Black PA-2800, Nubian Black PA-2801, Nubian Black PA-9800, Nubian Black PA-9801, Nubian Black PA-9811, Nubian Black PA-9802, Nubian Black PA-9803, Nubian Black EP-3, Nigrosine Base EE, Nigrosine Base SA, Nigrosine Base SAP, Nigrosine Base NB and Orient Spirit Black SB (all mfd. by Orient Chemical), Spirit Black No. 850 (mfd. by Sumitomo Chemical), Nigrosine Base LK (mfd. by BASF) and NYB27620B (mfd. by Sanyo Kako).

Preferred amount of the azine dye (E) to be used in the invention is from 0.01 to 5 parts by weight, more preferably from 0.1 to 3 parts by weight, per 100 parts by weight of the polyamide resin. Mixing amount of the azine dye (E) if larger than 5 parts by weight would entail reduction of mold releasing ability.

The glass fiber reinforced polyamide resin composition of the invention can be obtained, for example, by feeding predetermined amounts of a polyamide resin and a moldability improving agent from a feeding port (top feed) positioned on the most upstream side of a twin screw extruder, side-feeding a predetermined amount of glass fibers having a certain shape when the polyamide resin reached melted state, molding the mixture into a strand shape with a spinning hole attached to the downstream side tip of the extruder and then cooling and cutting the product. The term "when the polyamide resin reached melted state" as used herein means a time when temperature of the melted polyamide resin reached a temperature of endothermic peak temperature (melting point) plus 20° C. or more, of the polyamide resin measured at a programming rate of 20° C./minute using a differential scanning calorimeter (DSC). In this connection, in the case of the use of a mixture of two or more polyamide resins, it is judged that the polyamide resin mixture reached melted state when the temperature reached melting point plus 20° C. or more of a polyamide resin having the highest melting point.

The glass fiber reinforced polyamide resin composition of the invention can be used in a molding processing such as injection molding, extrusion molding, blow molding or press molding.

In addition, as occasion demands, the resin composition of the invention can be formulated with various additives including thermal stabilizers for polyamide use such as a copper compound and a phosphorus compound, antioxidants such as a hindered phenol and a hindered amine, light stabilizers such as a manganese compound, nucleating agents such as talc and boron nitride, mineral fillers such as calcium carbonate, wollastonite, kaolin, baked kaolin and mica, and coloring agents such as carbon black, titanium oxide and a phthalocyanine dye, as well as plasticizers, anti-static agents and other thermoplastic resins, within such a range that they do not spoil the object of the invention.

EXAMPLES

The present invention will be illustrated in greater detail with reference to the following Examples and Comparative Examples, but the invention should not be construed as being limited thereto. In this connection, raw materials and measuring methods used in the Examples and Comparative Examples are described below.

Raw Materials (1) Polyamide Resin:
PA-1: polyamide 66, relative viscosity 2.5, the number of amino-terminal groups 45 milli-equivalents based on 1 kg of the polyamide resin, copper based stabilizer added (Cu concentration 100 ppm)
PA-2: polyamide 66, relative viscosity 2.5, the number of amino-terminal groups 45 milli-equivalents based on 1 kg of the polyamide resin
PA-3: polyamide 66/6I, relative viscosity 2.0, the number of amino-terminal groups 60 milli-equivalents based on 1 kg of the polyamide resin
PA-4: polyamide 6, relative viscosity 2.5, the number of amino-terminal groups 50 milli-equivalents based on 1 kg of the polyamide resin (2) Glass Fibers:
GF-1: average diameter of glass fiber 10 $\mu$m, average length of glass fiber 3 mm, major components of binder: butadiene-maleic anhydride copolymer and N-$\beta$(aminoethyl)$\gamma$-aminopropyltriethoxysilane, adhered amount of binder 0.4% by weight
GF-2: average diameter of glass fiber 13 $\mu$m, average length of glass fiber 6 mm, major components of binder: styrene-maleic anhydride copolymer and $\gamma$-aminopropyltriethoxysilane, adhered amount of binder 0.6% by weight
GF-3: average diameter of glass fiber 10 $\mu$m, average length of glass fiber 3 mm, major components of binder: urethane and $\gamma$-aminopropyltriethoxysilane, adhered amount of binder 0.4% by weight
GF-4: average diameter of glass fiber 10 $\mu$m, average length of glass fiber 3 mm, major components of binder: urethane and $\gamma$-aminopropyltriethoxysilane, adhered amount of binder 0.05% by weight
GF-5: average diameter of glass fiber 10 $\mu$m, average length of glass fiber 3 mm, major components of binder: acryl-maleic anhydride copolymer and N-$\beta$(aminoethyl)$\gamma$-aminopropyltriethoxysilane, adhered amount of binder 1.8% by weight (3) Higher Fatty Acid Amide Compound:
EBS: ethylenebisstearylamide (Armowax EBS powder, mfd. by Lion)

(4) Higher Fatty Acid Metal Salt:
StCa-1: calcium stearate, acid value 0.02 mg KOH/g, free fatty acid 0.01%
StCa-2: calcium stearate, acid value 1.0 mg KOH/g, free fatty acid 0.5%

(5) Azine Dye:
Nigrosine (Nubian Black PA-9801, mfd. by Orient Chemical)

Preparation of Test Pieces (1) Preparation of Tensile Strength Test Pieces and Bending Test Pieces:
Using an injection molding machine (PS40E, mfd. by Nissei Jushi) and at a mold temperature of 80° C., ASTM D638 TYPE I and a test piece of 5 inches in length×0.5 inch in width×⅛ in thickness were molded.

(2) Preparation of Fatigue Test Pieces:
Using the injection molding machine (PS40E, mfd. by Nissei Jushi) and at a mold temperature of 80° C., ASTM-D1822 tensile impact dumbbell (Type S) was molded. Water absorption of the thus obtained test pieces was adjusted to 0.2% by weight or less.

Measuring Method (I) Measurement of Modulus of Elasticity and Interface Thickness of Graft Polyamide Resin Layer:

Measuring surface of each sample was finished into a mirror-finished surface by freezing the polyamide resin composition or a molded article thereof and cutting it with a diamond knife. Using the thus obtained cut face as the sample to be measured, two-dimensional distribution of the modulus of elasticity of the dynamic viscoelasticity function calculated from the amplitude of response stress signal and phase difference between stimulation distortion signal and response stress signal in the interface region between the glass fibers and polyamide resin existing in the cut face was measured under the following conditions by a scanning viscoelasticity microscope (SPA300HV, mfd. by Seiko Instruments). In this case, a product made of $Si_3N_4$, double side-coated with gold and having a spring constant of 0.09 $N \cdot m^{-1}$ was used as the cantilever.

Measuring atmosphere: in vacuo, frequency: 4 kHz, temperature: 30° C., dynamic distortion amplitude: 1.0 nm, load on probe: ca. 5.0 nN In more illustratively describing, amplitude of response stress signal (A') and phase shift between stimulation distortion signal and response stress signal ($\phi_H$) of a hard silicon wafer sample on the apparatus were measured in advance. Next, values of the amplitude of response stress signal (A) and the phase difference between stimulation distortion signal and response stress signal ($\phi$) of a sample to be measured were calculated. Next, corrected value of the phase ($\phi_{cal}=\phi-\phi_H$) and corrected ratio of the amplitude ($\beta=A/A'$) were calculated. Thereafter, relative value of the modulus of elasticity (E) was obtained by the following formula.

$$E = HE_c \beta(\cos\phi_{cal} - \beta)/(1+\beta^2 - 2\beta\cos\phi_{cal})$$

H: a form factor regarding contact of the probe with the sample surface
$E_c$: spring constant of cantilever Also, thickness of the graft polyamide resin layer was calculated from the two-dimensional distribution of the modulus of elasticity. In more illustratively describing, thickness of the graft polyamide resin layer was measured in the radial direction from the circular section tip of glass fibers and calculated from the average thickness of a region which continuously changes until modulus of elasticity of the glass fibers reaches modulus of elasticity of the matrix polyamide resin as shown in FIG. 3.

(II) Amount of Graft Polyamide:

A 5 g portion of the glass fiber reinforced polyamide resin composition was mixed with 100 ml of 90% phenol (stirring at 40° C. for 2 hours). By allowing this to stand still, the glass fiber part was precipitated and the supernatant polyamide-phenol solution was removed. The remaining glass fiber part was further washed by adding 100 ml of 90% phenol (stirring at 40° C. for 2 hours). By allowing this to stand still, the glass fiber part was precipitated and the supernatant solution was removed. After repeating this step three times, 100 ml of 99.5% ethanol was added to remove phenol (stirring at 40° C. for 2 hours). By allowing this to stand still, the glass fiber part was precipitated and the supernatant solution was removed. After repeating this step three times, ethanol was removed by drying at 80° C. for 2 days and nights with a nitrogen flow dryer. The fibers obtained in this manner are called graft glass fibers herein.

Amount of the graft polyamide was measured in the following manner by treating the thus obtained graft glass fibers in accordance with JIS R3420. One gram or more of the graft glass fibers were collected and their mass was measured. Next, after drying at 110±5° C. for 1 hour or more, they were put in a desiccator to spontaneously cool to room temperature and then their mass was measured (m1). They were heated in an electric furnace at 625±20° C. until constant weight was obtained (15 minutes) and taken out and put in a desiccator to spontaneously cool to room temperature, and then their mass was measured (m2). By calculating the ignition loss in accordance with formula (1), the grafted amount (W0: % by weight) was obtained.

$$W0=\{(m1-m2)/m1\}\times 100 \quad (1)$$

(III) Acid Value of Higher Fatty Acid Metal Salt:

A 20 g portion of each sample was put into a conical flask and dissolved by adding 30 ml of a mixed solvent consisting of 3 parts by weight of ethyl ether (first grade) and 7 parts by weight of ethyl alcohol (first grade). The sample-dissolved solution was mixed with 0.3 ml of a phenolphthalein indicator solution and titrated with a 0.1 mol/liter potassium hydroxide methanol standard solution. When the slightly pink color continued for 30 seconds, it was judged as the neutralization point, and the acid value was calculated based on the following formula.

$$\text{Acid value(mg-KOH/g)}=(A\times f\times K)/M$$

In this formula, A: amount (ml) of the potassium hydroxide methanol standard solution required for the titration, f: factor of the potassium hydroxide methanol standard solution, K: 5.611 and M: amount of sample (g).

(IV) Tensile Strength:

In accordance with the procedure of ASTM D638, each test piece was measured using a tensile tester (UTM 25, mfd. by Toyo Seiki) under conditions of 23° C. and a cross head speed of 5 mm/min.

(V) Young's Modulus in Flexure:

In accordance with the procedure of ASTM D790, each test piece was measured using a tensile tester (UTM 25, mfd. by Toyo Seiki) under conditions of 23° C., a cross head speed of 5 mm/min and a span of 50 mm.

(VI) Fatigue Characteristics:

Using a vibration fatigue tester (hydraulic servo fatigue tester EFH-50-10-3, mfd. by Sagimiya Seisakusho), measurement was carried out under conditions of tensile load control, chuck distance: 20 mm, peripheral temperature: 120° C., frequency: 20 Hz, and stress mode: tensile-tensile, minimum load 5.4 MPa and 120° C.

(VII) Appearance of Moldings:

Surface appearance of the central part of each test piece molded at a mold temperature of 80° C. for a filling time of 1.2 second, using an IS150E molding machine manufactured by Toshiba Machine and a plate mold of 130 mm×130 mm×3 mm, was measured as glossiness in accordance with the procedure of JIS-K7105 using a handy glossimeter IG-320 manufactured by Horiba.

Figure 2:
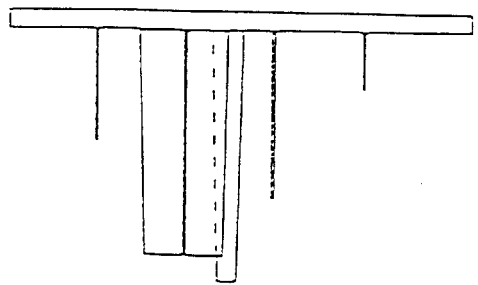
FIG. 2 is a schematic illustration showing external force of the test piece for measuring dry spots in appearance on a ribbed plate used in the Examples of the invention.
Figure 2:
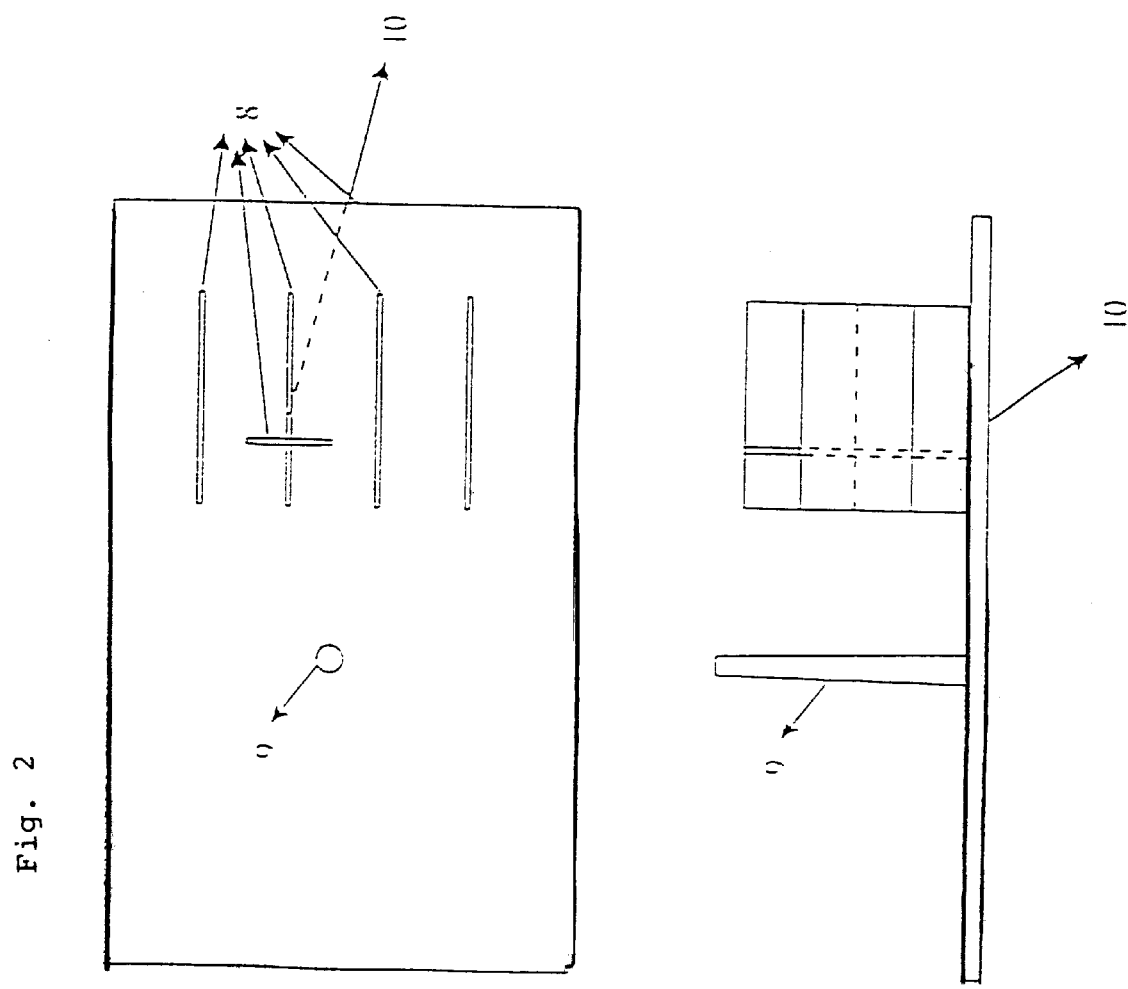

(VIII) Dry Spots on Ribbed Plate:

Backside surface appearance of the rib of each test piece molded at a mold temperature of 80° C. for a filling time of 1.2 second, using the IS150E molding machine manufactured by Toshiba Machine and a plate mold shown in FIG. 2, was measured as glossiness in accordance with the procedure of JIS-K7105 using the handy glossimeter IG-320 manufactured by Horiba.

(IX) Mold Release Ability:

Molding was carried out using a mold equipped with a mold release ability measuring apparatus shown in FIG. 1 and an FN3000 injection molding machine manufactured by Nissei Jushi under conditions of a cylinder temperature of 290° C. and an injection pressure of 400 kg/cm$^2$, and the ejection stress when each of the resulting moldings was ejected from the mold was measured. Smaller value of this means superior mold release ability.

Examples 1 to 11

Using a twin screw extruder TEM35BS manufactured by Toshiba Machine and under conditions of a cylinder setting temperature of 290° C., a screw speed of 300 rpm and a total feed rate of 50 kg/hr, mixed materials other than glass fibers were supplied through the top feed port, glass fibers were supplied through the side feed port at the ratio shown in Table 1 in the melted polyamide resin, and the strand extruded from the spinning port was cooled, cut into pellets of 3 mm in length and 3 mm in diameter and then dried to obtain pellets of the glass fiber reinforced polyamide resin composition. The thus obtained pellets were molded by the method described in the foregoing a cylinder temperature of 290° C. and evaluated. The results are shown in Table 1.

Comparative Examples 1 to 6

Glass fiber reinforced polyamide resin compositions were obtained by the same method of Example 1, except that compositions of the top-feeding mixed materials and side-feeding glass fibers were changed as shown in Table 2, and their various characteristics were evaluated. The results are shown in Table 2.

In the following tables, the mode of the change in the modulus of elasticity along the thickness direction is also shown in parenthesis for each Example with referring to model case (11) or (12) shown in FIG. 3.

TABLE 1

| Example | | 1 | 2 | 3 | 4 | 5 | 6 | 7 | 8 | 9 | 10 | 11 |
|---|---|---|---|---|---|---|---|---|---|---|---|---|
| Compositional ratio of mixed materials | | | | | | | | | | | | |
| Kind of polyamide | — | PA-1 | PA-1 | PA-1 | PA-1 | PA-1 | PA-1 | PA-2 | PA-3 | PA-4 | PA-1 | PA-1 |
| Amount of polyamide added | wt. part | 100 | 100 | 100 | 100 | 100 | 100 | 100 | 100 | 100 | 100 | 100 |
| Amount of EBS added | wt. part | 0.15 | 0.75 | 0.15 | 0.15 | 0.15 | 0.15 | 0.15 | 0.15 | 0.15 | 0.15 | 0.15 |
| Kind of calcium stearate | — | StCa-1 | StCa-1 | StCa-1 | StCa-1 | StCa-1 | StCa-1 | StCa-1 | StCa-1 | StCa-1 | StCa-1 | StCa-1 |
| Amount of calcium stearate added | wt. part | 0.3 | 0.3 | 0.75 | 0.3 | 0.3 | 0.3 | 0.3 | 0.3 | 0.3 | 0.30 | 0.30 |
| Kind of glass fiber | — | G-1 | G-1 | G-1 | G-1 | G-2 | G-5 | G-1 | G-1 | G-1 | G-3 | G-4 |
| Amount of glass fiber added | wt. part | 50 | 50 | 50 | 50 | 50 | 50 | 50 | 50 | 50 | 50 | 50 |
| Amount of nigrosine added | wt. part | 0.4 | 0.4 | 0.4 | — | 0.4 | 0.4 | 0.4 | 0.4 | 0.4 | 0.4 | 0.4 |
| Analyses | | | | | | | | | | | | |
| Amount of graft polyamide | % by wt. | 0.31 | 0.32 | 0.30 | 0.30 | 0.31 | 0.28 | 0.28 | 0.28 | 0.26 | 0.04 | 0.03 |
| Covering ratio of graft polyamide | % | 86 | 79 | 82 | 82 | 78 | 82 | 77 | 77 | 76 | 46 | 63 |
| Aspect ratio of glass fiber | — | 35 | 35 | 36 | 35 | 35 | 34 | 35 | 35 | 38 | 34 | 34 |
| Minimum value of modulus of elasticity of graft polyamide resin layer* ()** | | >1 (11) | >1 (11) | >1 (11) | >1 (11) | 22 1 (11) | 22 1 (11) | >1 (11) | >1 (11) | >1 (11) | <1 (12) | <1 (12) |
| Thickness of graft polyamide resin layer | μm | 1.6 | 1.6 | 1.6 | 1.5 | 1.4 | 1.6 | 1.4 | 1.4 | 1.4 | 0.7 | 0.7 |
| Evaluation of characteristics | | | | | | | | | | | | |
| Tensile strength | MPa | 210 | 209 | 212 | 210 | 210 | 219 | 210 | 188 | 210 | 191 | 189 |
| Young's modulus in flexure | GPa | 9.6 | 9.6 | 9.6 | 9.6 | 9.6 | 9.6 | 9.6 | 9.2 | 9.6 | 8.3 | 7.2 |
| Vibration fatigue strength (80 MPa) | frequency | 5.2 × 10⁵ | 3.9 × 10⁵ | 4.3 × 10⁵ | 4.0 × 10⁵ | 3.9 × 10⁵ | 5.1 × 10⁵ | 4.0 × 10⁵ | 3.7 × 10⁵ | 3.8 × 10⁵ | 8.5 × 10⁴ | 8.1 × 10⁴ |
| Gloss value of moldings (plate) | — | 70 | 70 | 69 | 68 | 73 | 69 | 68 | 75 | 85 | 67 | 65 |
| Dry spots on ribbed plate | — | ○ | ○ | ○ | Δ | ○ | ○ | ○ | ○ | ○ | ○ | ○ |
| Mold release ability (ejection stress) | kg/cm² | 160 | 140 | 150 | 150 | 160 | 160 | 170 | 160 | 170 | 160 | 160 |
| Torque at the time of melt kneading | kg-cm | 60 | 59 | 55 | 55 | 60 | 60 | 60 | 60 | 60 | 60 | 60 |

*based on polyamide resin
**schematic illustration of modulus of elasticity as shown in FIG. 3

TABLE 2

| Comparative Example | | 1 | 2 | 3 | 4 | 5 | 6 |
|---|---|---|---|---|---|---|---|
| Compositional ratio of mixed materials | | | | | | | |
| Kind of polyamide | — | PA-1 | PA-1 | PA-1 | PA-1 | PA-1 | PA-1 |
| Amount of polyamide added | wt. part | 100 | 100 | 100 | 100 | 100 | 100 |
| Amount of EBS added | wt. part | — | — | 0.15 | 0.15 | 0.15 | 0.15 |
| Kind of calcium stearate | — | — | StCa-1 | — | StCa-1 | StCa-1 | StCa-2 |
| Amount of calcium stearate added | wt. part | — | 0.30 | — | 0.30 | 0.30 | 0.3 |
| Kind of glass fiber | — | G-1 | G-1 | G-1 | G-1 | G-1 | G-1 |
| Amount of glass fiber added | wt. part | 50 | 50 | 50 | 15 | 200 | 50 |
| Amount of nigrosine added | wt. part | 0.4 | 0.4 | 0.4 | 0.4 | 0.4 | 0.4 |
| Analyses | | | | | | | |
| Amount of graft polyamide | % by wt. | 0.30 | 0.31 | 0.31 | 0.05 | | 0.3 |
| Covering ratio of graft polyamide | % | 81 | 79 | 80 | 83 | | 75 |
| Aspect ratio of glass fiber | — | 33 | 34 | 34 | 35 | | 35 |
| Minimum value of modulus of elasticity of graft polyamide resin layer* ()** | | >1 (11) | >1 (11) | >1 (11) | <1 (12) | | >1 (11) |
| Thickness of graft polyamide resin layer | μm | 1.6 | 1.6 | 1.6 | 0.3 | | 1.3 |
| Evaluation of characteristics | | | | | | | |
| Tensile strength | MPa | 216 | 218 | 218 | 115 | extrusion failed | 165 |
| Young's modulus in flexure | GPa | 9.6 | 9.6 | 9.6 | 5.4 | | 5.5 |
| Vibration fatigue strength (80 MPa) | frequency | 5.2 × 10⁵ | 5.0 × 10⁵ | 5.4 × 10⁵ | 1.3 × 10³ | | 4.8 × 10⁴ |
| Gloss value of moldings (plate) | — | 56 | 60 | 56 | 68 | | 69 |
| Dry spots on ribbed plate | — | X | X | X | ○ | | ○ |

TABLE 2-continued

| Comparative Example | | 1 | 2 | 3 | 4 | 5 | 6 |
|---|---|---|---|---|---|---|---|
| Mold release ability (ejection stress) | kg/cm$^2$ | 290 | 290 | 240 | 120 | | 200 |
| Torque at the time of melt kneading | kg-cm | 75 | 60 | 73 | 55 | | 55 |

*based on polyamide resin
**schematic illustration of modulus of elasticity as shown in FIG. 3

The glass fiber reinforced polyamide resin composition of the invention can reduce torque at the time of melt kneading, and moldings obtained by molding the composition are not only excellent in mechanical characteristics and durability but also show excellent surface appearance and improved fluidity at the time of molding, so that it can be suitably used in automobile under hood parts such as engine cover, radiator tank, car heater tank, water bulb, water pump and radiator pipe, which need strict reliability and good appearance of moldings.

While the present invention has been described in detail and with reference to specific examples thereof, it will be apparent to one skilled in the art that various changes and modifications can be made therein without departing from the spirit and scope thereof.

What is claimed is:

1. A glass fiber reinforced polyamide resin composition comprising:
  (A) a polyamide resin; and, per 100 parts by weight thereof,
  (B) from 20 to 170 parts by weight of glass fibers;
  (C) from 0.01 to 5 parts by weight of a higher fatty acid amide compound; and
  (D) from 0.005 to 5 parts by weight of a higher fatty acid metal
  salt having an acid value of 0.5 mg KOH/g or less, further having a graft polyamide resin layer in an interface region between the polyamide resin (A) and glass fiber (B),
  wherein the graft polyamide resin layer has a modulus of elasticity of dynamic viscoelasticity function as calculated from an amplitude of response stress signal and a phase difference between a stimulation distortion signal and a response stress signal, each measured by a scanning viscoelasticity microscopic method, of at least larger than 1 when regarding the modulus of elasticity of the polyamide resin as 1, and wherein the graft polyamide resin layer has a thickness of from 1.0 μm to 20 μm.

2. The glass fiber reinforced polyamide resin composition according to claim 1, further comprising (E) from 0.01 to 5 parts by weight of an azine dye per 100 parts by weight of a polyamide resin (A).

3. The glass fiber reinforced polyamide resin composition according to claim 2, wherein said graft polyamide resin in the interface between the polyamide resin (A) and glass fibers (B) is present in an amount from 0.1 to 2 parts by weight per 100 parts by weight of the glass fibers (B).

4. The glass fiber reinforced polyamide resin composition according to claim 3, wherein said graft polyamide resin covers from 50 to 100% of the total surface area of the glass fibers (B).

5. The glass fiber reinforced polyamide resin composition according to claim 1 or 2, wherein the glass fibers (B) are surface-treated with a binder mainly comprising: a copolymer of maleic anhydride with an unsaturated monomer; and an aminosilane coupling agent.

6. The glass fiber reinforced polyamide resin composition according to claim 5, wherein the glass fibers (B) contain from 0.1 to 2 parts by weight of the binder per 100 parts by weight of the glass fiber.

7. The glass fiber reinforced polyamide resin composition according to claim 1 or 2, wherein the glass fibers (B) existing in the polyamide resin (A) has an aspect ratio (weight average fiber length/number average fiber diameter) of from 10 to 50, and the number average fiber diameter is within the range of from 8 to 25 μm.

8. The glass fiber reinforced polyamide resin composition according to claim 1 or 2, wherein the polyamide resin (A) is at least one compound selected from polyamide 66, polyamide 6, polyamide 610, polyamide 612, copolymers and blends thereof, and copolymers and blends of polyhexamethylene isophthalamide (polyamide 6I) with polyamide 66 and optionally polyamide 6.

9. The glass fiber reinforced polyamide resin composition according to claim 1 or 2, wherein the polyamide resin (A) has a relative viscosity of from 1.6 to 3.7 as measured at 25° C. and at a concentration of 1% in 98% sulfuric acid in accordance with JIS K6810.

10. A molded article which comprises a reinforced polyamide resin composition comprising:
  (A) a polyamide resin; and, per 100 parts by weight thereof,
  (B) from 20 to 170 parts by weight of glass fibers;
  (C) from 0.01 to 5 parts by weight of a higher fatty acid amide compound; and
  (D) from 0.005 to 5 parts by weight of a higher fatty acid metal salt having an acid value of 0.5 mg KOH/g or less, further having a graft polyamide resin layer in an interface region between the polyamide resin (A) and glass fiber (B),
  wherein the graft polyamide resin layer has a modulus of elasticity of dynamic viscoelasticity function as calculated from an amplitude of response stress signal and a phase difference between a stimulation distortion signal and a response stress signal, each measured by a scanning viscoelasticity microscopic method, of at least larger than 1 when regarding the modulus of elasticity of the polyamide resin as 1, and wherein the graft polyamide resin layer has a thickness of from 1.0 μm to 20 μm.

11. The molded article according to claim 10, wherein the reinforced polyamide resin composition further comprises from 0.01 to 5 parts by weight of an azine dye (E), per 100 parts by weight of the polyamide resin (A).

* * * * *